UNITED STATES PATENT OFFICE.

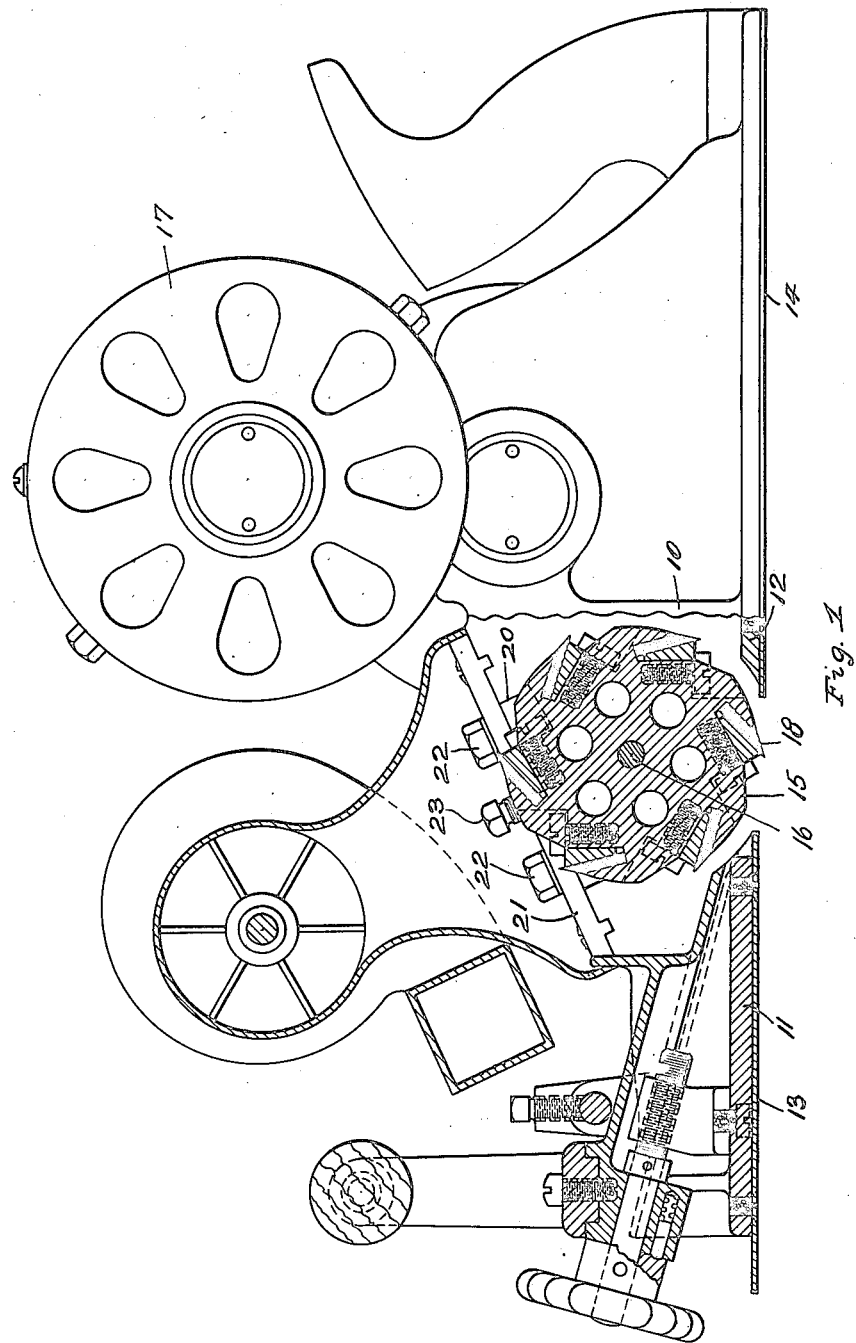

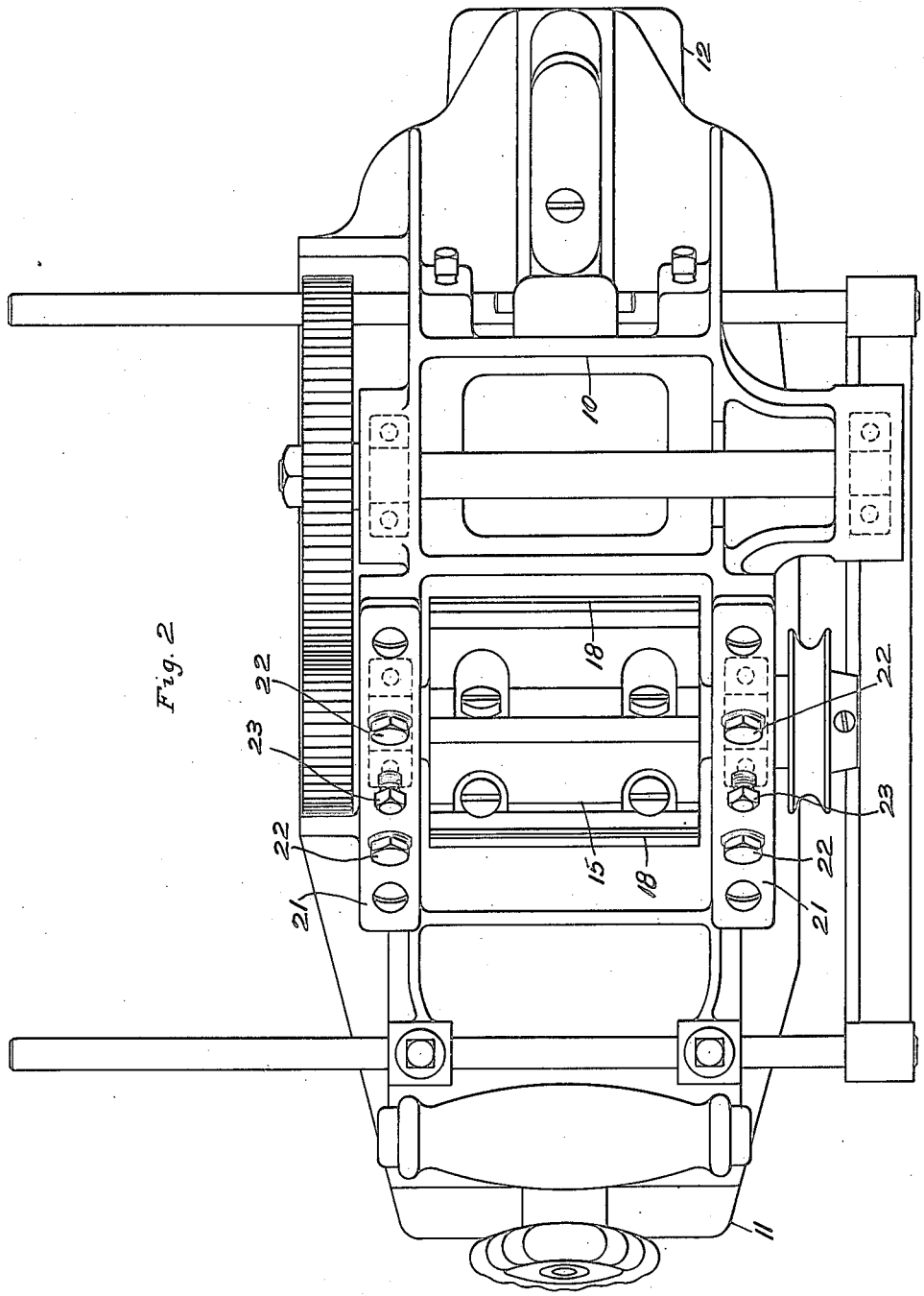

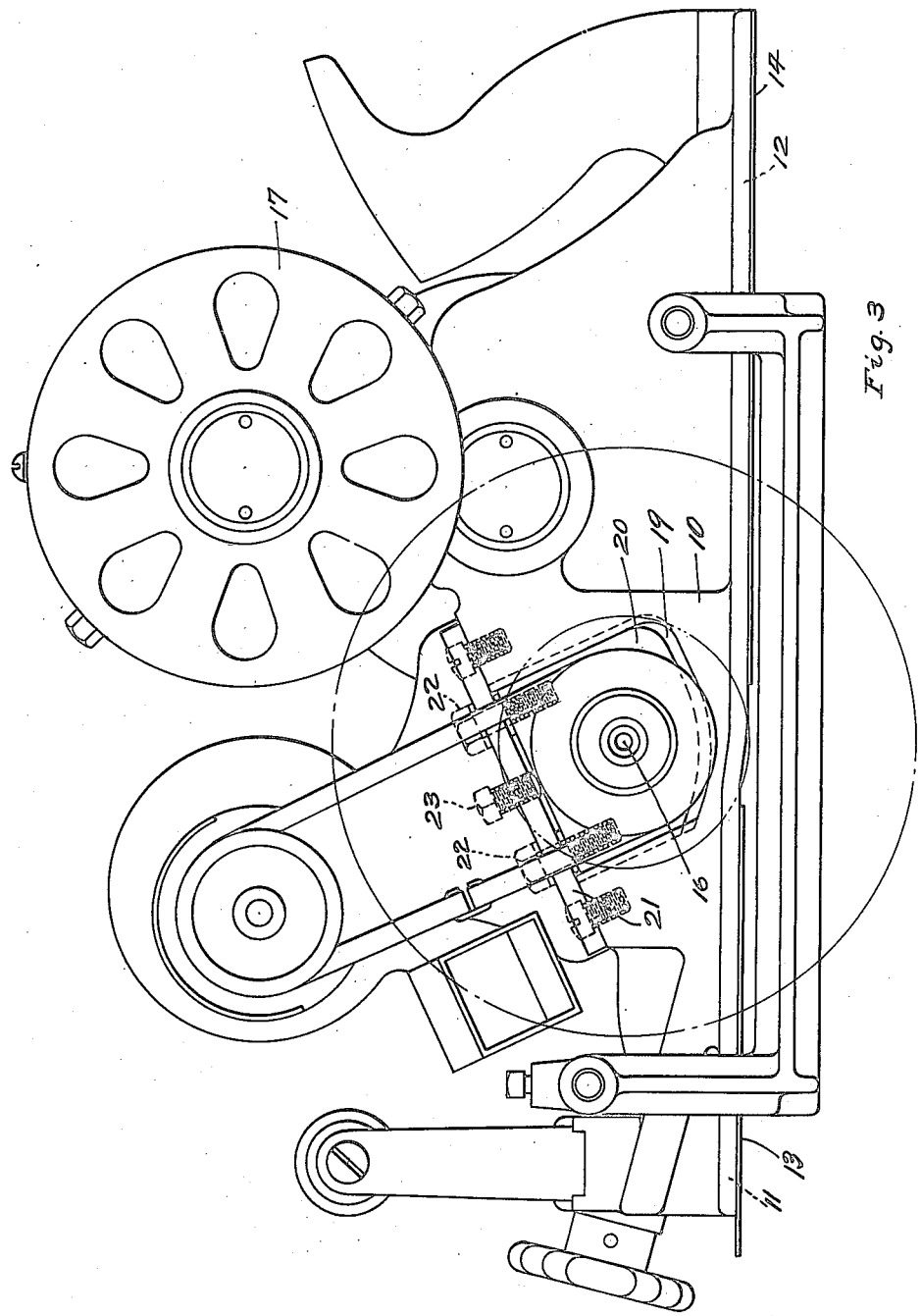

JOHN F. HOY AND JOHN C. WHITESELL, JR., OF NORRISTOWN, PENNSYLVANIA, ASSIGNORS TO THE LUSTER-JORDAN COMPANY, OF NORRISTOWN, PENNSYLVANIA, A CORPORATION OF PENNSYLVANIA.

HAND PLANER.

1,426,739.  Specification of Letters Patent.  Patented Aug. 22, 1922.

Original application filed August 7, 1919, Serial No. 315,986. Divided and this application filed June 30, 1921. Serial No. 481,679.

*To all whom it may concern:*

Be it known that we, JOHN F. HOY and JOHN C. WHITESELL, Jr., citizens of the United States, residing at Norristown, county of Montgomery, State of Pennsylvania, have jointly invented certain new and useful Improvements in Hand Planers, of which the following is a specification, the same being a division of our application for Letters Patent filed August 7, 1919, and serially numbered 315,986.

This invention relates to the type of planer shown and described in Letters Patent #1,281,207 and has for its leading object to improve the cutter shaft bearing arrangement thereof for commercially bettering this type of planer. Other and further objects relate to the provision of certain new and novel arrangements, connections and combinations of parts for attaining the ends sought by said leading object.

The invention consists of the improvements hereinafter described and finally claimed.

The nature, characteristic features and scope of the invention will be more fully understood from the following description taken in connection with the accompanying drawings forming part hereof, and in which:—

Fig. 1, is a longitudinal sectional view of a planer embodying features of the invention.

Fig. 2, is a top or plan view of Fig. 1, and

Fig. 3, is a view in side elevation of Fig. 2.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the drawings 10 designates the supporting frame of the planer the two-part central base of which is designated 11—12, the part 11 being movable with respect to part 12. The base as a whole is flat from end to end of the planer and said base parts have fixed thereto rigid shoes designated 13—14 respectively. The base parts are spaced from one another to provide an opening in which operates a cutter 15 fixed to a driven shaft 16. Rotary motion is imparted to said shaft through the instrumentality of a train of gear wheels interposed between said shaft and an electric motor 17. The shaft 16 is so mounted with respect to frame 10 as to be capable of being adjusted in a substantially vertical manner to compensate for wear of the knives 18 of the rotary cutter. The frame 10 is cut away as at 19 to receive slidable blocks 20 in which the shaft 16 is journaled. The upper edges of the frame 10 are inclined and grooved as clearly illustrated in Fig. 1. Fixed to such inclined portions are plates 21 having tongues which fit in the grooves of frame 10 and serve to maintain said plates against displacement. Each block 20 is secured to a plate 21 by screws 22. A block adjusting screw 23 penetrates plate 21 and engages a block 20. By loosening screws 22 and tightening screws 23 blocks 20 may be moved sufficiently to lower cutter to compensate for wear of the cutter knives.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What we claim is:—

1. In a planer the combination of frames the sides of which are provided with inclined slots to receive blocks and the upper faces of which are inclined and grooved, slidable blocks mounted in said slots, a cutter journaled in said blocks, plates provided with tongues fitted to the grooves of said frames, screws securing said blocks with respect to said plates and adjusting screws passing through said plates and engaging said blocks whereby upon loosening of the first mentioned screws and tightening of the adjusting screws said cutter may be lowered.

2. In a planer a pair of frames each frame being provided with an inclined slot to receive a block and each frame provided with an inclined and grooved upper face, a slidable block mounted in each slot, a cutter journaled in said blocks, a plate provided with tongues mounted upon each of said inclined faces and fitting the grooves thereof, means for securing said plates to said frames, screws for securing said blocks with respect to said plates and an adjusting screw for each block which screws penetrate said plates.

In testimony whereof, we have hereunto signed our names.

JOHN F. HOY.
J. C. WHITESELL, Jr.